United States Patent [19]

Nakanishi et al.

[11] Patent Number: 5,877,237
[45] Date of Patent: Mar. 2, 1999

[54] THERMOSETTING SILICONE COMPOSITION

[75] Inventors: Junji Nakanishi; Toshio Saruyama; Atsushi Togashi, all of Chiba Prefecture, Japan

[73] Assignee: Dow Corning Toray Silicone Co., Ltd., Tokyo, Japan

[21] Appl. No.: 357,634

[22] Filed: Dec. 16, 1994

[30] Foreign Application Priority Data

Dec. 29, 1993 [JP] Japan ................................ 5-353802

[51] Int. Cl.⁶ .................................................. C08G 77/08
[52] U.S. Cl. ............................ 523/211; 523/209; 528/15
[58] Field of Search ..................... 523/209, 211

[56] References Cited

U.S. PATENT DOCUMENTS

| | | | |
|---|---|---|---|
| 4,481,341 | 11/1984 | Schlak et al. | 525/478 |
| 4,784,879 | 11/1988 | Lee et al. | 427/213.34 |
| 4,874,667 | 10/1989 | Lee et al. | 428/402.22 |
| 5,015,691 | 5/1991 | Lewis et al. | 525/100 |
| 5,017,654 | 5/1991 | Togashi et al. | 525/100 |
| 5,494,750 | 2/1996 | Fujioka et al. | 428/402.21 |
| 5,525,425 | 6/1996 | Fujioka et al. | 428/405 |
| 5,616,632 | 4/1997 | Fujiki et al. | 523/211 |

FOREIGN PATENT DOCUMENTS

| | | |
|---|---|---|
| 347895 | 12/1989 | European Pat. Off. |
| 41707 | 11/1978 | Japan. |
| 4-46962 | 2/1992 | Japan. |

*Primary Examiner*—Margaret W. Glass
*Attorney, Agent, or Firm*—Sharon K. Severance

[57] ABSTRACT

The thermosetting silicone composition of the instant invention is comprised of (a) a diorganopolysiloxane containing alkenyl groups, (b) an organohydrogenpolysiloxane, (c) a platinum catalyst-containing silicone resin fine particle catalyst comprised of (i) a thermoplastic silicone resin containing 5 to 90 mole % $PhSiO_{3/2}$ siloxane units and 5 to 20 mole % $MeViSiO_{2/2}$ siloxane units, wherein Ph denotes phenyl, Me denotes methyl and Vi denotes vinyl; said resin having a glass transition point of 40° to 70° C. and (ii) 0.05 to 2 wt % as platinum atoms of a platinum catalyst; and (d) a hydrosilation reaction inhibiting compound. The thermosetting silicone compositions have excellent storage stability at about room temperature, and cure at a fast rate when heated.

10 Claims, No Drawings

THERMOSETTING SILICONE COMPOSITION

BACKGROUND OF THE INVENTION

Several platinum catalyst-containing thermoplastic resin fine particle catalysts are known as curing acceleration catalysts for silicone compositions which cure by a hydrosilation reaction.

For example, U.S. Pat. No. 4,481,341 to Schlak et al., JP (Kokai) 64-47442, JP (Kokai) 64-51140, and U.S. Pat. No. 5,015,691 to Lewis et al., describe platinum catalyst-containing organic thermoplastic resin fine particle catalysts. However, these organic thermoplastic resin fine particle catalysts are inferior in heat resistance. Further, they have some disadvantages in that silicone compositions using them as a curing acceleration catalyst tend to show inferior mechanical properties and discoloration caused when heated for curing or when used at high temperatures after curing.

As a method to solve this problem, it has been proposed to use platinum catalyst-containing thermoplastic silicone resin catalysts. For example, in JP 53-41707 and U.S. Pat. No. 4,481,341, methods have been proposed to obtain a thermoplastic platinum catalyst-containing silicone resin fine particle catalyst by mechanically grinding mixtures of a platinum catalyst and a thermoplastic silicone resin. Although these methods have been effective for relatively low activity platinum catalysts such as 2-ethylhexanol solution of chloroplatinic acid or isopropyl alcohol-modified chloroplatinic acid they have a disadvantage in that they are barely effective to inhibit catalyst activity when applied to high activity platinum catalysts. Furthermore, it has been difficult to obtain fine particle catalysts of less than 10 $\mu$m in average particle size by these methods. Therefore, when they are used as a curing acceleration catalyst for the silicone composition, the catalyst diffusion during thermal curing reaction is not sufficient. This results in a problem in that the curing reaction of the silicone composition may not be completed.

EP 0347895 to Togashi et al., U.S. Pat. No. 5,017,654 to Togashi et al. and JP (Kokai) 4-46962 to Saruyama et al. describe thermoplastic silicone resin fine particle catalysts containing high activity platinum catalysts. Specifically, EP 0347895 describes a hydrosilation reaction catalyst for which the thermoplastic resin containing high activity platinum catalyst is pulverized to fine particles, and then the platinum catalyst existing on the surface is removed by washing off, so that the catalyst activity is suppressed. The high activity catalyst is then released by heating. Also, U.S. Pat. No. 5,017,654 and JP (Kokai) 4-46962 describe silicone compositions which cure quickly during thermal curing by the combined use of platinum catalyst-containing thermoplastic silicone resin fine particle catalyst and a particular kind of compound. By these methods, it became possible to manufacture thermosetting silicone compositions featured in that they can be stored stably at room temperature over a long period of time, and quickly complete curing during thermal curing, and yet the essential characteristics of the silicone compositions are not impaired. However, it has been difficult to control the curing rate and the storage stability by these methods. Further, there has been such a problem that the storage stability would be degraded with increasing the curing rate, and the curing rate would be reduced with increasing the storage stability.

It has now been found that when a special thermoplastic silicone resin is used to produce the platinum catalyst-containing thermoplastic silicone fine particle catalyst, it is possible to control the releasing temperature of the platinum catalyst when heated, so that it is possible to control the curing rate and the storage stability.

Therefore, it is an objective of the present invention to present a thermosetting silicone composition which is excellent in storage stability in the vicinity of room temperature, and of which the curing rate is fast when heated.

SUMMARY OF THE INVENTION

The instant invention pertains to thermosetting silicone compositions which have excellent storage stability at about room temperature, and cure quickly by heating.

The thermosetting silicone compositions of the instant invention are comprised of (a) a diorganopolysiloxane containing alkenyl groups; (b) an organohydrogenpolysiloxane; (c) a platinum catalyst-containing silicone resin fine particle catalyst having an average particle size 0.01 to 10.0 $\mu$m wherein said platinum catalyst-containing silicone resin fine particle catalyst is comprised of (i) a thermoplastic silicone resin containing 5 to 90 mole % PhSiO3/2 siloxane units and 5 to 20 mole % MeViSiO$_{2/2}$ siloxane units, wherein Ph denotes phenyl, Me denotes methyl and Vi denotes vinyl; said resin having a glass transition point of 40° to 70° C. and (ii) 0.05 to 2 wt % as platinum atoms of a platinum catalyst; and (d) a hydrosilation reaction inhibiting compound.

THE INVENTION

The instant invention pertains to a thermosetting silicone composition comprised of (a) 100 parts by weight of a diorganopolysiloxane containing at least 2 alkenyl groups in a molecule;

(b) an organohydrogenpolysiloxane containing at least 3 silicon atom-bonded hydrogen atoms in a molecule wherein said organohydrogenpolysiloxane is present in an amount sufficient to bridge diorganopolysiloxane (a);

(c) 0.1–100 ppm as platinum atoms based on (a) of a platinum catalyst-containing silicone resin fine particle catalyst having an average particle size 0.01 to 10.0 $\mu$m wherein said platinum catalyst-containing silicone resin fine particle catalyst is comprised of (i) a thermoplastic silicone resin containing 5 to 90 mole % PhSiO$_{3/2}$ siloxane units and 5 to 20 mole % MeViSiO$_{2/2}$ siloxane units, wherein Ph denotes phenyl, Me denotes methyl and Vi denotes vinyl; said resin having a glass transition point of 40° to 70° C. and (ii) 0.05 to 2 wt % as platinum atoms of a platinum catalyst; and (d) 0.0001–1 parts by weight of a hydrosilation reaction inhibiting compound.

Diorganopolysiloxane (a) is the major agent in the composition of the present invention, and it requires at least 2 silicon atom-bonded alkenyl groups in a molecule. The alkenyl groups may be exemplified by, but not limited to, vinyl groups, allyl groups, hexenyl groups and others. The remaining groups on diorganopolysiloxane (a) are silicon atom-bonded organic groups. The silicon atom-bonded organic groups, other than the alkenyl groups, are monovalent hydrocarbon groups which may be exemplified by, but not limited to, alkyl groups such as methyl groups, ethyl groups, propyl groups, butyl groups, hexyl groups, octyl groups, and others; aryl groups such as phenyl groups; and substituted hydrocarbon groups such as 3,3,3-trifluoropropyl groups. The number of silicon atom-bonded organic groups on the average should preferably be 1.0–2.3. Diorganopolysiloxane (a) is usually a straight chain, but it can also be a branched siloxane structure. The degree of polymerization of diorganopolysiloxane (a) is not limited, however, it is preferred to use a diorganopolysiloxane having a viscosity in the range of 10–1,000,000 mPa·s at 25° C.

Organohydrogenpolysiloxane (b) is the bridging agent for diorganopolysiloxane (a). In order for the composition of the instant invention to form a network structure, it is required that organohydrogenpolysiloxane (b) have at least 3 silicon atom-bonded hydrogen atoms per molecule. The remaining groups on the organohydrogenpolysiloxane are silicon atom-bonded organic groups. The silicon atom-bonded organic groups, other than the hydrogen atoms, can be the same as those described for the diorganopolysiloxane (a). Such organic groups can be a single kind, or can be a mixture of two or more kinds. The molecular structure of organohydrogenpolysiloxane (b) can be straight chain, network, or 3-dimensional. Further, organohydrogenpolysiloxane (b) can be a single polymer, copolymer, or a mixture of two or more kinds of polymers. The degree of polymerization of organohydrogenpolysiloxane (b) is usually in the range of 0.5–50,000 mPa·s at 25° C., preferably in the range of 1–10,000 mPa·s.

Organohydrogenpolysiloxane (b) is added at an amount such that the ratio of the silicon atom-bonded hydrogen atoms in organohydrogenpolysiloxane (b) and the silicon atom-bonded alkenyl groups in diorganopolysiloxane (a) are in the range of 0.5/1–10/1. Preferably there is present 0.1–10 parts by weight organohydrogenpolysiloxane (b) per 100 parts by weight diorganopolysiloxane (a).

The platinum catalyst-containing thermoplastic silicone resin fine particle catalyst (c) functions as the catalyst to cure the composition of the present invention. The platinum catalyst-containing silicone resin fine particle catalyst is comprised of (i) a thermoplastic silicone resin containing 5 to 90 mole % $PhSiO_{3/2}$ siloxane units and 5 to 20 mole % $MeViSiO_{2/2}$ siloxane units, wherein Ph denotes phenyl, Me denotes methyl and Vi denotes vinyl; said resin having a glass transition point of 40° to 70° C. and (ii) 0.05 to 2 wt % as platinum atoms of a platinum catalyst.

As for the platinum catalyst (ii), known platinum catalysts, which show the hydrosilation catalyst activity, can be used. Specifically, the platinum catalyst can be chloroplatinic acid, alcohol-modified chloroplatinic acid, complex of platinum and olefin, complex of platinum and ketone, complex of platinum and vinylsiloxane, platinum supported by alumina, silica, carbon black, etc., platinum black, and so forth. Among these, the complex of platinum and vinylsiloxane is preferred because of its high activity and its compatibility with the diorganopolysiloxane (a) and organohydrogenpolysiloxane (b).

The thermoplastic silicone resin (i) used in the platinum catalyst-containing thermoplastic silicone resin fine particle catalyst (c) contains 5–90 mole % $PhSiO_{3/2}$ siloxane units (Ph denotes the phenyl group) and 5–20 mole % $MeViSiO_{2/2}$ siloxane units (Me denotes the methyl group and Vi denotes the vinyl group). If there is less than 5 mole % $PhSiO_{3/2}$ siloxane units the storage stability of the composition of the present invention is degraded, and if it exceeds 90 mole %, sufficient curing activity cannot be obtained. If there is less than 5 mole % $MeViSiO_{2/2}$ siloxane units the thermal curing rate of the composition of the present invention becomes low, and if it exceeds 20 mole %, the curing activity is impaired. Furthermore, the thermoplastic silicone resin used in the platinum catalyst-containing thermoplastic silicone resin fine particle catalyst has to have the glass transition point in the range of 40°–70° C. If the glass transition point is below 40° C., the storage stability of the composition of the present invention is degraded drastically, and if the glass transition point is higher than 70° C., sufficient thermal curing rate cannot be obtained. The glass transition point can be determined by a Differential Scanning Calorimeter (DSC). The thermoplastic silicone resins optimal for the present invention can be exemplified by the following average unit formulas:

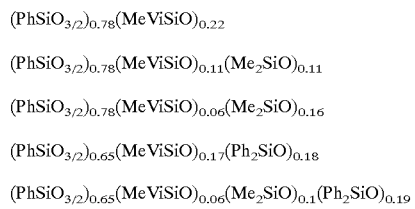

$(PhSiO_{3/2})_{0.78}(MeViSiO)_{0.22}$ $(PhSiO_{3/2})_{0.78}(MeViSiO)_{0.11}(Me_2SiO)_{0.11}$ $(PhSiO_{3/2})_{0.78}(MeViSiO)_{0.06}(Me_2SiO)_{0.16}$ $(PhSiO_{3/2})_{0.65}(MeViSiO)_{0.17}(Ph_2SiO)_{0.18}$ $(PhSiO_{3/2})_{0.65}(MeViSiO)_{0.06}(Me_2SiO)_{0.1}(Ph_2SiO)_{0.19}$

In the above formulas Ph denotes a phenyl group, Me denotes a methyl group and Vi denotes a vinyl group. These thermoplastic silicone resins can be used as a single resin, or a mixture of two or more silicone resins, particularly, a mixture of a silicone resin containing vinyl groups and a silicone resin not containing a vinyl group. If the mixture of silicone resins used are compatible, and the overall unit formula is within the above range, the objective of the present invention is achieved.

The platinum catalyst-containing silicone resin fine particle catalyst (c) is required to have an average particle size 0.01–10.0 μm. If the average particle size exceeds 10.0 μm, even if the composition of the present invention is heated, the curing would be incomplete and the heat resistance, etc. of the silicone composition would be impaired. On the other hand, if the average particle size is less than 0.01 μm, it becomes difficult to attain sufficient storage stability for the composition. The average particle size can be measured by the centrifugal sedimentation method or by the laser scattering method.

The platinum catalyst-containing silicone resin fine particle catalyst (c) used in the instant invention can be manufactured by methods known in the art. For example, U.S. Pat. No. 4,481,341 discloses a method comprising dissolving the platinum catalyst and the silicone resin in an organic solvent, and then drying the organic solvent to manufacture the platinum catalyst-containing silicone resin, and pulverizing it. EP 0347895 discloses a method comprising dissolving the platinum catalyst and the silicone resin in a low boiling point solvent, dripping this solution into aqueous solution of surfactant to form an oil in water (O/W) type emulsion. The solid fine particles are formed by gradually removing the low boiling point solvent from it, and then recovering these solid fine particles from the aqueous solution. U.S. Pat. No. 5,153,160 discloses a method comprising dissolving the platinum catalyst and the silicone resin in an organic solvent, followed by spraying this solvent solution into a hot gas flow to evaporate the organic solvent and at the same time to solidify the platinum catalyst-containing silicone resin in the fine particle state while it is in a mist form. Among these, the method shown in U.S. Pat. No. 5,153,160 is preferred since it is easier to obtain fine particles of uniform particle size, the production efficiency is high, and the chance of impurity contamination is less.

The ratio of the platinum catalyst to the silicone resin should be such that the content of the platinum catalyst in the platinum catalyst-containing silicone resin fine particle catalyst (c) is 0.05–2.00 weight % as platinum atoms. If the ratio is less than 0.05 weight %, the ratio of silicone resin in the composition of the present invention becomes too high, and the physical characteristics after the curing may sometimes be impaired. Also, if the ratio exceeds 2.0 weight %, it becomes difficult to keep the platinum catalyst inside of the fine particles, resulting in drastic degradation of the storage stability of the composition of the present invention. The amount of platinum catalyst-containing silicone resin fine particle catalyst (c) should be in the range of 0.1–100 ppm as platinum atoms based on diorganopolysiloxane (a) and preferably in the range of 0.5–50 ppm. Since the amount of the platinum catalyst-containing silicone resin fine particle catalyst (c) itself is determined by the content of the platinum catalyst in the platinum catalyst-containing silicone resin fine particle catalyst (c) the amount of (c) is not particularly limited, but usually, the amount of (c) is in the range of 0.005–10 parts by weight per 100 parts by weight of diorganopolysiloxane (a).

The hydrosilation reaction inhibiting compound (d) is the necessary to accelerate curing and to complete the curing when the composition of the present invention is heated and cured. The hydrosilation reaction inhibiting compound (d) is a compound which has a catalyst inhibition effect against the hydrosilation reaction catalyst. Any compound known in the art to have an effect to delay curing or an effect to improve storage stability of the silicone elastomer compositions which cure by hydrosilation reaction can be used. The hydrosilation reaction inhibiting compound (d) may be exemplified by, but not limited to, phosphorus-containing compounds such as triphenylphosphine and others; nitrogen-containing compounds such as tributylamine, tetramethylethylenediamine, benzotriazole and others; sulfur-containing compounds; acetylene compounds; compounds containing 2 or more alkenyl groups; hydroperoxy compounds; maleic acid derivatives; and other compounds. Among these, the compounds containing alkenyl groups or alkynyl groups are preferred. In particular, more preferred are compounds containing 2 or more alkynyl groups in a molecule, compounds containing an alkenyl group and an alkynyl group in a molecule, compounds containing an alkenyl group and an alcoholic hydroxyl group in a molecule, maleic diester and organic silicon compounds which have a bonding unit in which alkenyl groups are bonded to both silicon atoms which are adjoined via an oxygen atom.

The degree of the curing acceleration effect by the hydrosilation reaction inhibiting compound (d) differs greatly depending on the chemical structure of the hydrosilation reaction inhibiting compound (d). Therefore, the amount of the hydrosilation reaction inhibiting compound (d) should be adjusted to the optimal amount on each of the hydrosilation reaction inhibiting compound (d) used. However, in general, if the amount is too small, the curing acceleration effect would not be obtained, and, on the other hand, if it is too much, it would rather inhibit the curing. Therefore, the preferable range of hydrosilation reaction inhibiting compound (d) is 0.0001–1 part by weight per 100 parts by weight of diorganopolysiloxane (a).

Although the composition in the present invention is the thermosetting silicone composition comprised of the above components (a)–(d), additional components can be added as long as the objective of the present invention is not impaired. The additional components may be exemplified by, but not limited to, fine powder silica such as fumed silica and wet method silica, surface-hydrophobicized fine powder silica, crepe hardening inhibitors, organic polymers other than silicone, organic solvents, iron oxide, heat-resisting agents such as rare earth compounds, etc., manganese carbonate, flame retardant agents such as fine powder titanium oxide; diatomaceous earth, calcium carbonate, glass fiber, carbon black, and others.

The composition in the present invention can be easily obtained by uniformly mixing the above components (a)–(d). Although there is no particular limitation for the order of mixing the components, the preferable method is to mix the platinum catalyst-containing silicone resin fine particle catalyst (c) and a small amount of diorganopolysiloxane (a) to uniform dispersion, and add the mixture of (a) and (c) to a mixture of the organohydrogenpolysiloxane (b) and hydrosilation reaction inhibiting compound (d). Any method can be used as long as the granulated platinum catalyst is not destroyed. The temperature at which the components are mixed varies depending on the platinum catalyst-containing silicone resin fine particle catalyst (c) used and cannot be specified generally. However, the components should not be mixed at a temperature of more than 50° C. above the glass transition point of the silicone resin used for the platinum catalyst-containing silicone resin fine particle catalyst (c).

The composition in the present invention has excellent storage stability at room temperature, cures quickly by heating to form hardened silicone, and the mechanical characteristics of the cured silicone is not degraded in the high temperature use, nor does it cause discoloration. Consequently, it is appropriately used in the areas where such characteristics are required, for example, as the silicone adhesive for electric-electronic equipment, the silicone rubber gasket, and the silicone rubber composition for various silicone rubber parts.

EXAMPLES

So that those skilled in the art can understand and appreciate the invention taught herein, the following examples are presented, it being understood that these examples should not be used to limit the scope of this invention found in the claims attached hereto.

In the following examples, viscosity is the value at 25° C., % denotes weight %, Ph denotes a phenyl group, Vi denotes a vinyl group and Me denotes a methyl group.

Preparation Example 1

Preparation of Platinum-vinylsiloxane Complex Composition 6 grams of a chloroplatinic acid aqueous solution (platinum content 33%) and 16 grams of 1,3-divinyltetramethyldisiloxane were dissolved in 35 grams of isopropyl alcohol. 10 grams of sodium hydrogencarbonate was added to this solution, and while stirring in suspension state, the mixture was reacted at 70°–80° C. for 30 minutes. After cooling, solid was removed by filtering, and an isopropyl alcohol solution of platinum-vinylsiloxane complex composition (platinum content 4.2%) was obtained.

Preparation Example 2

Preparation of Platinum Catalyst-containing Fine Particle Catalyst (No. 2)

900 grams of a thermoplastic silicone resin of the formula $(PhSiO_{3/2})_{0.78}(MeViSiO)_{0.22}$ and having a glass transition point of 65.2° C., 500 grams of toluene and 4,600 grams of dichloromethane were loaded into a glass container with an attached stirrer and mixed uniformly. 44.4 grams of the platinum-vinylsiloxane complex composition obtained in Preparation Example 1 was added and mixed and a uniform solution of platinum-vinylsiloxane complex composition and the thermoplastic silicone resin was obtained. This solution was then sprayed continuously into the spray-dryer chamber (manufactured by Ashizawa Niro Atomizer Co.) with hot nitrogen gas flow using a 2 fluid nozzle. The temperature of the hot nitrogen gas flow was 95° C. at the inlet of the spray dryer and 45° C. at the outlet of the spray dryer. The hot gas flow rate was 1.3 m³/min. After 1 hour operation, 450 grams of a platinum-vinylsiloxane complex-containing silicone resin fine particle catalyst was manufactured in the bag filter. The average particle size of the resulting fine particle catalyst was 1.4 μm, and the platinum content was 0.40%. It was confirmed that the resulting fine particle catalyst was spherical by observation using a scanning electron microscope.

Preparation Example 3

Preparation of Platinum Catalyst-containing Fine Particle Catalyst (No. 3)

A platinum-vinylsiloxane complex-containing silicone resin fine particle catalyst was manufactured in the same manner as in Preparation Example 2 except that the thermoplastic silicone resin used in Preparation Example 2 was replaced by a silicone resin of the formula $(PhSiO_{3/2})_{0.78}(MeViSiO)_{0.11}(Me_2SiO)_{0.11}$ and having a glass transition point of 68.9° C. The average particle size of the resulting fine particle catalyst was 1.7 μm and the platinum content was 0.40%. It was confirmed that the resulting fine particle catalyst was spherical by observation using a scanning electron microscope.

Preparation Example 4

Preparation of Platinum Catalyst-containing Fine Particle Catalyst (No. 4)

A platinum-vinylsiloxane complex-containing silicone resin fine particle catalyst was manufactured in the same manner as in Preparation Example 2 except that the thermoplastic silicone resin used in Preparation Example 2 was replaced by a silicone resin of the formula $(PhSiO_{3/2})_{0.78}(MeViSiO)_{0.06}(Me_2SiO)_{0.16}$ and having a glass transition point of 62.3° C. The average particle size of the resulting fine particle catalyst was 1.5 μm and the platinum content was 0.40%. It was confirmed that the resulting fine particle catalyst was spherical by observation using a scanning electron microscope.

Preparation Example 5

Preparation of Platinum Catalyst-containing Fine Particle Catalyst (No. 5)

450 grams of a thermoplastic silicone resin of the formula $(PhSiO_{3/2})_{0.78}(MeViSiO)_{0.22}$ and having a glass transition point of 65.2° C., 450 grams of a resin of the formula $(PhSiO_{3/2})_{0.78}(Me_2SiO)_{0.22}$ and having a glass transition point of 64.8° C., 500 grams of toluene and 4,600 grams dichloromethane were loaded into a glass container with an attached stirrer, and mixed uniformly. 44.4 grams of the platinum-vinylsiloxane complex composition obtained in Preparation Example 1 was added to the mixture and a uniform solution of platinum-vinylsiloxane complex composition and the thermoplastic silicone resin was obtained. The average unit formula of the two silicone resins used here was $(PhSiO_{3/2})_{0.78}(MeViSiO)_{0.11}(Me_2SiO)_{0.11}$.

This solution was then sprayed continuously into the spray-dryer chamber (manufactured by Ashizawa Niro Atomizer Co.) with hot nitrogen gas flow using a 2 fluid nozzle. The temperature of the hot nitrogen gas flow was 95° C. at the inlet of the spray dryer and 45° C. at the outlet of the spray dryer. The hot gas flow rate was 1.3 m³/min. After 1 hour operation, 450 grams of a platinum-vinylsiloxane complex-containing silicone resin fine particle catalyst was manufactured in the bag filter. The average particle size of the resulting fine particle catalyst was 1.3 μm, and the platinum content was 0.40%. It was confirmed that the resulting fine particle catalyst was spherical by observation using a scanning electron microscope.

Preparation Example 6

Preparation of Platinum Catalyst-containing Fine Particle Catalyst By the Silicone Resin Not Containing Vinyl Group (No. 6)

A platinum-vinylsiloxane complex-containing silicone resin fine particle catalyst was manufactured in the same manner as Preparation Example 2 except that the thermoplastic silicone resin used in Preparation Example 2 was replaced by a silicone resin of the formula $(PhSiO_{3/2})_{0.78}(Me_2SiO)_{0.22}$ and having a glass transition point of 64.8° C. The average particle size of the resulting fine particle catalyst was 1.5 μm and the platinum content was 0.40%. It was confirmed that the resulting fine particle catalyst was spherical by observation using a scanning electron microscope.

Preparation Example 7

Preparation of Platinum Catalyst-containing Fine Particle Catalyst By the Silicone Resin Not Containing Vinyl Group (No. 7)

A platinum-vinylsiloxane complex-containing silicone resin fine particle catalyst was manufactured in the same manner as in Preparation Example 2 except that the thermoplastic silicone resin used in Preparation Example 2 was replaced by a silicone resin of the formula $(PhSiO_{3/2})_{0.90}(Me_2SiO)_{0.10}$ and having a glass transition point of 95.6° C. The average particle size of the resulting fine particle catalyst was 1.5 μm and the platinum content was 0.40%. It was confirmed that the resulting fine particle catalyst was spherical by observation using a scanning electron microscope.

Preparation Example 8

Preparation of Platinum Catalyst-containing Fine Particle Catalyst By the Silicone Resin Not Containing Vinyl Group (No. 8)

A platinum-vinylsiloxane complex-containing silicone resin fine particle catalyst was manufactured in the same manner as in Preparation Example 2 except that the thermoplastic silicone resin used in Preparation Example 2 was replaced by a silicone resin of the formula $(PhSiO_{3/2})_{0.60}(MePhSiO)_{0.40}$ and having a glass transition point of 58.1° C. The average particle size of the resulting fine particle catalyst was 1.7 μm and the platinum content was 0.41%. It was confirmed that the resulting fine particle catalyst was spherical by observation using a scanning electron microscope.

EXAMPLE 1

Thermosetting silicone compositions were prepared using the platinum catalyst-containing fine particle catalysts obtained in Preparation Examples 2–8.

A base compound was prepared by uniformly mixing 12 grams of a fumed silica which was hydrophobicized with hexamethyldisilazane and a mixture containing 25 grams of α, ω-divinylpolydimethylsiloxane having a viscosity of 1,500 mPa·s and 50 grams of α, ω-divinylpolydimethylsiloxane having a viscosity 10,000 mPa·s, 1.2 grams of an organopolysiloxane shown by the average molecular formula $Me_3SiO(Me_2SiO)_3(MeHSiO)_5SiMe_3$ and 0.03 grams of phenylbutynol. Thermosetting diorganopolysiloxane compositions were then prepared by individually adding 0.125 grams of each platinum catalyst-containing fine particle catalyst No. 2-5 prepared in Preparation Examples 2-5 to the resulting base compound. Similarly, thermosetting diorganopolysiloxane compositions were manufactured by individually adding 0.125 grams of each platinum catalyst-containing fine particle catalyst No. 6–8 prepared in Preparation Examples 6–8 to the above base compound. Thermal curing characteristics of these compositions were measured at 130° C. and 150° C. by a Curastometer type 5 (manufactured by Orientec Co.). The thermal curing characteristics were determined by measuring the time to which the torque reaches 10% of the final value ($T_{10}$) and the time to which the torque reaches 90% of the final value ($T_{90}$). Here, $T_{10}$ can be regarded as the curing initiation time, and $T_{90}$ as the curing completion time. Also, the storage stability of these thermosetting silicone compositions was studied by an accelerating test comprising aging the thermosetting silicone compositions at 50° C. and measuring the viscosity at intervals of several days. The number of days before the viscosity value doubled was defined as the stable storage period. These measurement results are shown in Table 1.

TABLE 1

| Catalyst Used | Examples | | | | Comparison Examples | | |
|---|---|---|---|---|---|---|---|
|  | No.2 | No.3 | No.4 | No.5 | No.6 | No.7 | No.8 |
| Thermal Curing Characteristics (sec) 130° C. | | | | | | | |
| $T_{10}$ | 112.2 | 143.4 | 70.8 | 118.2 | 150.6 | 330.0 | 52.4 |
| $T_{90}$ | 143.4 | 165.0 | 85.2 | 139.2 | 170.4 | 372.4 | 77.0 |
| 150° C. | | | | | | | |
| $T_{10}$ | 29.4 | 36.0 | 22.8 | 30.0 | 36.0 | 75.0 | 27.4 |
| $T_{90}$ | 42.6 | 46.8 | 29.4 | 40.2 | 46.8 | 90.0 | 37.6 |
| Stable Storage Period (days) | 44 | 66 | 38 | 67 | 38 | 58 | 5 |

The thermosetting silicone composition in the present invention is featured in that it is excellent in storage stability and its curing rate is fast when heated since it consists of the above components (a)–(d), and in particular, the platinum catalyst-containing silicone resin fine particle catalyst (c) comprised of (i) a thermoplastic silicone resin containing 5 to 90 moles $PhSiO_{3/2}$ siloxane units and 5 to 20 mole % $MeViSiO_{2/2}$ siloxane units, wherein Ph denotes phenyl, Me denotes methyl and Vi denotes vinyl; said resin having a glass transition point of 40° to 70° C. and (ii) 0.05 to 2 wt % as platinum atoms of a platinum catalyst.

What is claimed is:

1. A thermosetting silicone composition comprising (a) 100 parts by weight of a diorganopolysiloxane containing at least 2 alkenyl groups in a molecule;

(b) an organohydrogenpolysiloxane containing at least 3 silicon atom-bonded hydrogen atoms in a molecule wherein said organohydrogenpolysiloxane is present in an amount sufficient to bridge diorganopolysiloxane (a);

(c) 0.1–100 ppm as platinum atoms based on the weight of (a) of a platinum containing silicone resin catalyst having an average particle size 0.01 to 10.0 μm wherein said platinum containing silicone resin catalyst is comprised of (i) a thermoplastic silicone resin containing 5 to 90 mole % $PhSiO_{3/2}$ siloxane units and 5 to 20 mole % $MeViSiO_{2/2}$ siloxane units, wherein Ph denotes phenyl, Me denotes methyl and Vi denotes vinyl; said resin having a glass transition point of 40° C. to 70° C. and (ii) 0.05 to 2 wt % as platinum atoms of a platinum catalyst; and (d) 0.0001–1 parts by weight of a hydrosilation reaction inhibiting compound.

2. A composition as claimed in claim 1 wherein diorganopolysiloxane (a) has a viscosity of 10–1,000,000 mPa·s at 25° C.

3. A composition as claimed in claim 1 wherein organohydrogenpolysiloxane (b) has a viscosity of 0.5–50,000 mPa·s at 25° C.

4. A composition as claimed in claim 1 wherein organohydrogenpolysiloxane (b) has a viscosity of 1–10,000 mPa·s.

5. A composition as claimed in claim 1 wherein the silicon atom-bonded hydrogen atoms in organohydrogenpolysiloxane (b) and the silicon atom-bonded alkenyl groups in diorganopolysiloxane (a) are in a range of 0.5/1 to 10/1.

6. A composition as claimed in claim 1 wherein there is present 0.1–10 parts by weight of organohydrogenpolysiloxane (b).

7. A composition as claimed in claim 1 wherein the platinum catalyst (ii) is a complex of platinum and vinylsiloxane.

8. A composition as claimed in claim 1 wherein there is present 0.5–50 ppm as platinum atoms based on the weight of (a) of the platinum containing silicone resin catalyst.

9. A composition as claimed in claim 1 wherein the hydrosilation reaction inhibiting compound is selected from the group consisting of phosphorus-containing compounds, nitrogen-containing compounds, sulfur-containing compounds, acetylene compounds; compounds containing 2 or more alkenyl groups, hydroperoxy compounds, and maleic acid derivatives.

10. A composition as claimed in claim 1 wherein there is 0.0001–1 part by weight of the hydrosilation reaction inhibiting compound (d).

* * * * *